United States Patent
Jiang et al.

(10) Patent No.: US 11,259,096 B2
(45) Date of Patent: Feb. 22, 2022

(54) HTML5-BASED AUDIO/VIDEO PLAYING METHOD AND APPARATUS, AND LIVE AUDIO/VIDEO STREAMING METHOD AND SYSTEM

(71) Applicant: WANGSU SCIENCE & TECHNOLOGY CO., LTD., Shanghai (CN)

(72) Inventors: Yupeng Jiang, Shanghai (CN); Longshi Cai, Shanghai (CN); Zhuqing Liu, Shanghai (CN); Shaobin Wu, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 865 days.

(21) Appl. No.: 16/060,790

(22) PCT Filed: May 23, 2017

(86) PCT No.: PCT/CN2017/085428
§ 371 (c)(1),
(2) Date: Jun. 8, 2018

(87) PCT Pub. No.: WO2018/188168
PCT Pub. Date: Oct. 18, 2018

(65) Prior Publication Data
US 2021/0168464 A1   Jun. 3, 2021

(30) Foreign Application Priority Data
Apr. 14, 2017 (CN) .......................... 201710242778.7

(51) Int. Cl.
*H04N 21/643* (2011.01)
*H04N 21/2187* (2011.01)
(Continued)

(52) U.S. Cl.
CPC ....... *H04N 21/643* (2013.01); *H04N 21/2187* (2013.01); *H04N 21/4398* (2013.01);
(Continued)

(58) Field of Classification Search
CPC .......... H04N 21/643; H04N 21/47202; H04N 21/2187; H04N 21/8543; H04N 21/4398; H04N 21/4402
See application file for complete search history.

(56) References Cited

U.S. PATENT DOCUMENTS 9,565,430 B1   2/2017 Steele et al.
9,703,947 B2 * 7/2017 Harrison ................... G06F 9/00
(Continued)

FOREIGN PATENT DOCUMENTS

CN   102469065 A   5/2012
CN   103136235 A   6/2013
(Continued)

OTHER PUBLICATIONS

The China National Intelleectual Property Administration (CNIPA) The China Search Report for 201710242778.7 dated Jan. 30, 2019 17 Pages.
(Continued)

*Primary Examiner* — Fernando Alcon

(57) ABSTRACT

An Html5-based audio/video playing method includes: based on a playing scenario, downloading audio/video data under the playing scenario; performing format conversion on the audio/video data; and loading the audio/video data after format conversion into an Html5 player.

12 Claims, 4 Drawing Sheets

(51) Int. Cl.
*H04N 21/439* (2011.01)
*H04N 21/4402* (2011.01)
*H04N 21/472* (2011.01)
*H04N 21/8543* (2011.01)

(52) U.S. Cl.
CPC ... *H04N 21/4402* (2013.01); *H04N 21/47202* (2013.01); *H04N 21/8543* (2013.01)

(56) References Cited

U.S. PATENT DOCUMENTS

| | | | |
|---|---|---|---|
| 2008/0235566 A1* | 9/2008 | Carlson | H04N 21/23439 715/205 |
| 2010/0198981 A1 | 8/2010 | Hsiao | |
| 2013/0198407 A1* | 8/2013 | Thoen | H04N 21/2662 709/233 |
| 2014/0075521 A1 | 3/2014 | Ma et al. | |
| 2014/0282784 A1* | 9/2014 | Pfeffer | H04N 21/8586 725/112 |
| 2014/0337411 A1* | 11/2014 | Panje | H04N 21/8456 709/203 |
| 2015/0143419 A1 | 5/2015 | Bhagwat et al. | |
| 2015/0379382 A1 | 12/2015 | Mizoguchi et al. | |
| 2016/0119399 A1 | 4/2016 | Glass | |
| 2017/0093939 A1* | 3/2017 | Bar-Mashiah | H04L 65/4069 |
| 2018/0213243 A1* | 7/2018 | Liu | H04N 21/2662 |
| 2019/0050492 A1* | 2/2019 | Kolodizner | G06F 16/957 |
| 2019/0253742 A1* | 8/2019 | Garten | H04N 21/2343 |

FOREIGN PATENT DOCUMENTS

| | | |
|---|---|---|
| CN | 103220577 A | 7/2013 |
| CN | 103338384 A | 10/2013 |
| CN | 103873938 A | 6/2014 |
| CN | 105100824 A | 11/2015 |
| WO | 2007053957 A1 | 5/2007 |

OTHER PUBLICATIONS

The European Patent Office (EPO) The Extended European Search Report for 17894675.2 (PCT/CN2017/085428) dated Jun. 14, 2019 9 Pages.

* cited by examiner

HTML5-BASED AUDIO/VIDEO PLAYING METHOD AND APPARATUS, AND LIVE AUDIO/VIDEO STREAMING METHOD AND SYSTEM

CROSS-REFERENCES TO RELATED APPLICATIONS

This application is a national phase entry under 35 U.S.C § 371 of International Application No. PCT/CN2017/085428, filed on May 23, 2017, which claims priority of Chinese Patent Application No. 201710242778.7, filed with the State Intellectual Property Office of P. R. China on Apr. 14, 2017, the entire contents of all of which are incorporated herein by reference.

FIELD OF THE DISCLOSURE

The present disclosure relates to the technical field of Internet streaming media and, more particularly, relates to Html5-based audio/video playing method and apparatus, and live audio/video streaming method and system.

BACKGROUND

Html5 (Hyper Text Markup Language 5) is a browser-based protocol standard, which allows different source materials to run smoothly in the browser. As the Flash declines and the Html5 emerges, many browsers reduce their support for the Flash, and many video websites gradually replace the Flash player with the Html5 player.

Currently, all latest versions of major browsers support the Html5 player. However, the video tag of the Html5 player that is used for audio/video playing merely supports three formats: mp4, webm, and ogg, and does not directly support the flv format which dominates the audio/video industry. Accordingly, following issues exist:

for the audio/video on-demand services, if the Html5 player is used, the video provider needs to convert a large number of stored flv files into mp4 files, otherwise, normal compatibility cannot be realized;

for the live audio/video streaming service, the mp4 format is not suitable for live streaming because of its special file structure, such that the current prevailing solution is to use the HLS (Http Live Streaming) protocol to realize the live streaming of a streaming media file at the Html5 player; however, the adoption of the HLS protocol may bring about the issue of long-time delay.

BRIEF SUMMARY OF THE DISCLOSURE

To solve issues in existing technologies, embodiments of the present disclosure provide a method and an apparatus for Html5-based audio/video playing, and a method and a system for live audio/video steaming. The technical solutions are as follows:

In one aspect, a method for Html5-based audio/video playing is provided, including following steps:

based on a playing scenario, downloading audio/video data under the playing scenario;

performing format conversion on the audio/video data; and loading the audio/video data after format conversion into an Html5 player.

Further, a step of based on a playing scenario, downloading audio/video data under the playing scenario may specifically include:

under an on-demand scenario, downloading the audio/video data based on a XMLHttpRequest protocol.

Further, a step of based on a playing scenario, downloading audio/video data under the playing scenario may specifically include:

under a live streaming scenario, downloading the audio/video data based on a Websocket protocol.

Further, a step of performing format conversion on the audio/video data specifically includes:

recognizing a format of the audio/video data, and determining whether the format of the audio/video data is a format supported by the Html5 player; and when the format of the audio/video data is not a format supported by the Html5 player, converting the format of the audio/video data into a format supported by the Html5 player.

Further, the format of the audio/video data at least includes a flv format.

In another aspect, a method for live audio/video streaming is provided, including the method for Html5-based audio/video playing.

In further another aspect, an apparatus for Html5-based audio/video playing is provided, including:

a downloading module, configured for, based on a playing scenario, downloading audio/video data under the playing scenario;

a format-converting module, configured for performing format conversion on the audio/video data;

a loading module, configured for loading the audio/video data after format conversion into an Html5 player.

Further, the downloading module includes a first downloading sub-module, where the first downloading sub-module is configured for, under an on-demand scenario, downloading the audio/video data based on a XMLHttpRequest protocol.

Further, the downloading module further includes a second downloading sub-module, where the second downloading sub-module is configured for, under a live streaming scenario, downloading the audio/video data based on a Websocket protocol.

Further, the format-converting module includes a determining sub-module and a converting sub-module.

The determining sub-module is configured for recognizing a format of the audio/video data, and determining whether the format of the audio/video data is a format supported by the Html5 player.

The converting sub-module is configured for, when the format of the audio/video data is not a format supported by the Html5 player, converting the format of the audio/video data into a format supported by the Html5 player.

Further, the format of the audio/video data at least includes a flv format.

In another aspect, a system for live audio/video streaming is provided, including the apparatus for Html5-based audio/video playing.

Advantageous effects brought about by technical solutions according to embodiments of the present disclosure are as follows:

by converting audio/video formats such as flv into a playing format supported by an Html5 player, the function of using the Html5 player to play an audio/video that has a format such as flv is realized, which enhances the compatibility of the Html5 player towards audio/video formats such as flv. Further, under the live streaming scenario, the Html5 player is utilized to replace the HLS protocol to directly play the audio/video data having an audio/video format like flv, such that the big issue of long-time delay brought about by the adoption of HLS protocol may be solved.

BRIEF DESCRIPTION OF THE DRAWINGS

To more clearly illustrate technical solutions of the present disclosure, accompanying drawings used in descriptions of embodiments hereinbelow are introduced briefly. Obviously, the accompanying drawings described hereinafter are only some embodiments of the present disclosure, and for those ordinarily skilled in the relevant art, other drawings may be obtained from these accompanying drawings without creative labor.

DETAILED DESCRIPTION

To make the objective, technical solutions and advantages of the present disclosure clearer, embodiments of the present disclosure are described in more details with reference to the accompanying drawings.

Embodiment 1

Figure 1:
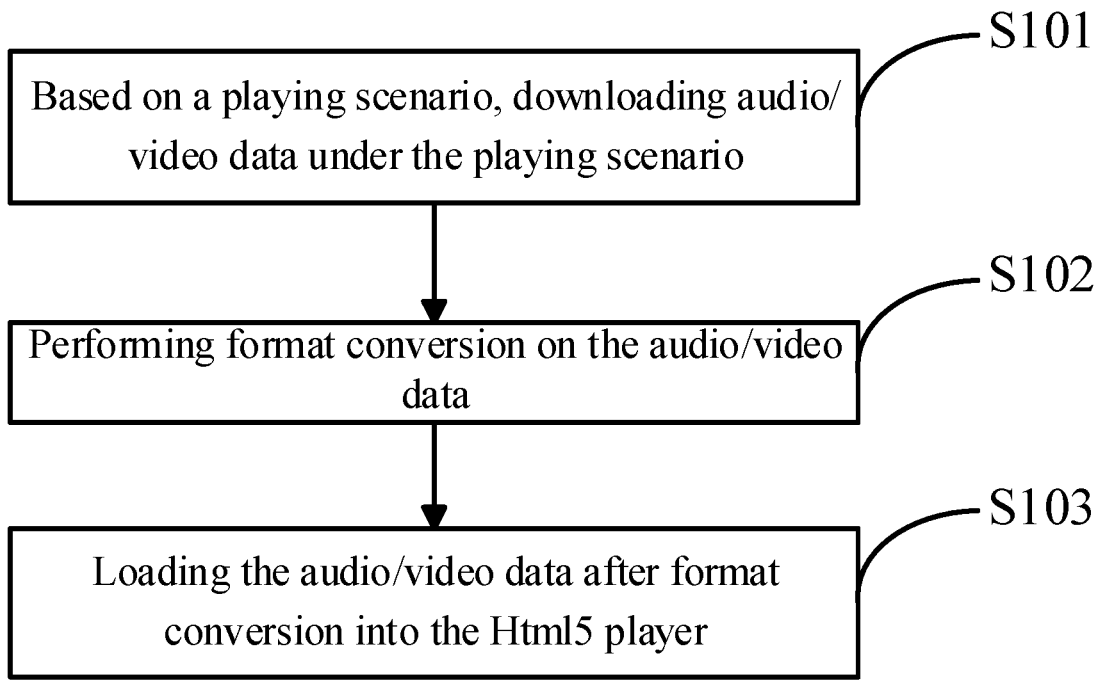
FIG. 1 illustrates a flow chart of an Html5-based audio/video playing method according to Embodiment 1 of the present disclosure.

Embodiments of the present disclosure provide an Html5-based audio/video playing method. Referring to FIG. 1, the method includes following steps:

S101: based on a playing scenario, downloading audio/video data under the playing scenario.

Playing scenarios include on-demand scenarios and live streaming scenarios. Under on-demand scenarios, recorded audio/video data may be played at various kinds of players. Such audio/video data may be stored at various types of servers, and a player may download the audio/video data through the various types of servers to play an audio/video. Under a live streaming scenario, data is recorded while being played, and because of the inner real-time requirement of the live streaming, a high requirement of time-delay is expected.

In one embodiment, for the two different types of playing scenarios, i.e., on-demand and live streaming scenarios, different data transmission protocols need to be selected to download the audio/video data.

Under an on-demand scenario, the audio/video data is downloaded based on an http protocol. For example, in one embodiment, an XMLHttpRequest protocol is applied to download the audio/video data.

Specifically, the XMLHttpRequest protocol is a protocol that may be used in script languages such as javaScript, Vb Script, and Jscript. The browser utilizes the XMLHttpRequest protocol to send a request to a server asynchronously, thereby acquiring a response sent back by the server. Further, partial update of a website may be realized without submission of the whole webpage to the server. After the whole webpage is loaded, the browser requests data from the server, and after the server receives and processes the data request, the server feeds back data to the browser.

In a live streaming scenario, the audio/video data may be downloaded based on a Websocket protocol.

More specifically, the WebSocket protocol is a new protocol under HTML5, which realizes full-duplex communication between the browser and the server. Accordingly, the server resources and the bandwidth are better saved. Further, real-time communication is realized, which enhances advancement of the live streaming.

It should be noted that, the present disclosure may provide a feature of solely realizing audio/video playing under an on-demand scenario or a live streaming scenario, and may also have a feature of realizing audio/video playing under an on-demand scenario and a live streaming scenario. Further, when downloading the audio/video data based on the XMLHttpRequest protocol or the WebSocket protocol, the formats of the audio/video data to be downloaded may include various types, such as flv, avi, and mkv. The present disclosure is not limited thereto.

S102: performing format conversion on the audio/video data.

The existing playing formats supported by the Html5 player include three types: mp4, webm, and ogg, and different browsers may each support certain types among the three types of formats. For example, an IE explorer may support the mp4 format, the Firefox browser may support the webm and ogg formats, and the Chrome browser may support the three types of formats including mp4, webm, and ogg. Thus, audio/video data not having the three types of formats may need to be processed to achieve the objective of using the Html5 player to play audio/videos in formats other than the aforementioned three types of formats.

Figure 2:
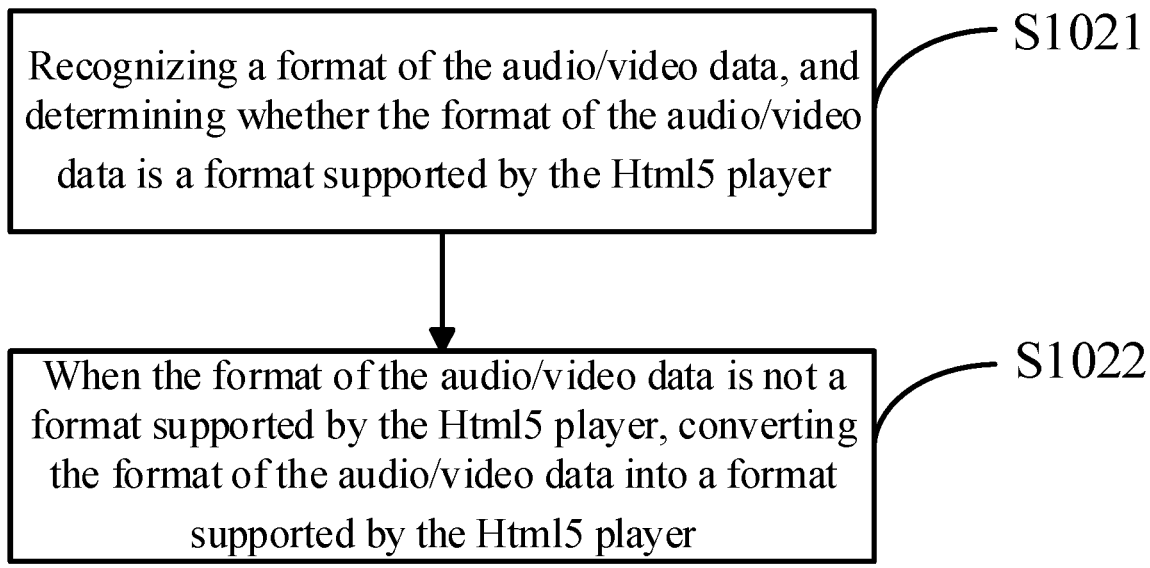
FIG. 2 illustrates a specific sub-step flow chart of step S102 according to Embodiment 1 of the present disclosure.

Referring to FIG. 2, in one embodiment, the step S102 of performing format conversion on the audio/video data specifically includes two sub-steps: S1021-S1022.

S1021: recognizing a format of the audio/video data, and determining whether the format of the audio/video data is a format supported by the Html5 player.

In one embodiment, the downloaded audio/video data may be analyzed first to acquire a format of the audio/video data. For example, by analyzing a packet header of a data packet of the audio/video data, the format of the audio/video data may be recognized. Further, whether the format of the audio/video data is a format supported by the Html5 player is determined. If the format of the audio/video data is not the mp4, webm, or ogg format, for example, the format of the audio/video data is the flv format, then the format of the audio/video data is not the format supported by the Html5 player.

S1022: when the format of the audio/video data is not a format supported by the Html5 player, converting the format of the audio/video data into a format supported by the Html5 player.

In one embodiment, after determining that the format of the audio/video data is not the format supported by the Html5 player through step S1021, whether the format of the audio/video data needs to be converted into mp4, webm, or ogg may be determined based on a type of the browser. For example, the IE browser supports the mp4 format, and under this situation, the format of the audio/video data may only be converted into the mp4 format. For example, the Chrome browser supports three types of formats including mp4, webm, and ogg. However, because of the wide application of the mp4 format, the mp4 format may preferably be selected for conversion. Obviously, format conversion may also be performed to convert the format of the audio/video data into any one of the three configured types of formats: mp4, webm, and ogg.

In one embodiment, the format of the audio/video data at least includes a flv format. Obviously, the format of the audio/video data may also be other formats such as avi, and mkv. The conversion process may be illustrated in detail using an example in which the flv format is converted into the mp4 format.

First, flv audio/video data is parsed to acquire various parameters of the flv audio/video data. The parsing process may specifically include following steps:

first, parsing a script tag of the flv audio/video data to acquire key frame information;

further, parsing AVCDecoderConfigurationRecord in a video tag of the flv audio/video data to acquire width, height, lengthSizeMinusOne, sps, pps, and codec of a video;

further, parsing AVC NALU in the video tag of the flv audio/video data to acquire video data of a video frame, parsing the video tag to acquire a timestamp of the video frame, encapsulating the video data and the timestamp into a designated video structure based on the aforementioned video parsing products for conversion into data in mp4 format;

further, parsing AudioSpecificConfig in an audio tag of the flv audio/video data to acquire channelCount, samplerate and config of an audio; and finally, parsing Raw AA frame data in the audio tag of the flv audio/video data to acquire audio data and a timestamp of an audio frame, and encapsulating the audio data and the timestamp into a designated audio structure based on the aforementioned audio parsing products for conversion into data in mp4 format.

After each of aforementioned parsing steps is completed, the aforementioned designated video structure and designated audio structure are encapsulated into a structural body. Based on conversion requirements, the aforementioned structural boy is converted into audio/video data in mp4 format.

S103: loading the audio/video data after format conversion into the Html5 player.

In one embodiment, after the processing of audio/video downloading and format conversion through steps S101 and S102, the audio/video data may already be played by the Html5 player. Under this case, the audio/video data after format conversion may need to be loaded into the Html5 player.

Specifically, a process of loading the audio/video data after format conversion into the Html5 player for playing may include:

first, creating mediaSource, and associating the mediaSource with a video element;

further, creating audioSourceBuffer and videoSourceBuffer for the mediaSource, for adding the audio/video data;

finally, creating audioSegments and videoSegments, to respectively store audio data and video data in the audio/video data after format conversion, and add the audio data and video data to the audioSourceBuffer and videoSourceBuffer at a proper moment, to complete the loading process.

It should be noted that, during the loading process, cache-control needs to be performed when necessary to avoid occupying too much memory and to avoid affecting the playing effects. Further, to ensure that playing starts from the key frame and to improve the experience effect, a video progress bar may be introduced to realize a function of dragging control. When the video progress bar is dragged to an uncached region, it may be ensured that data can be correctly requested and the playing continues.

Figure 3:
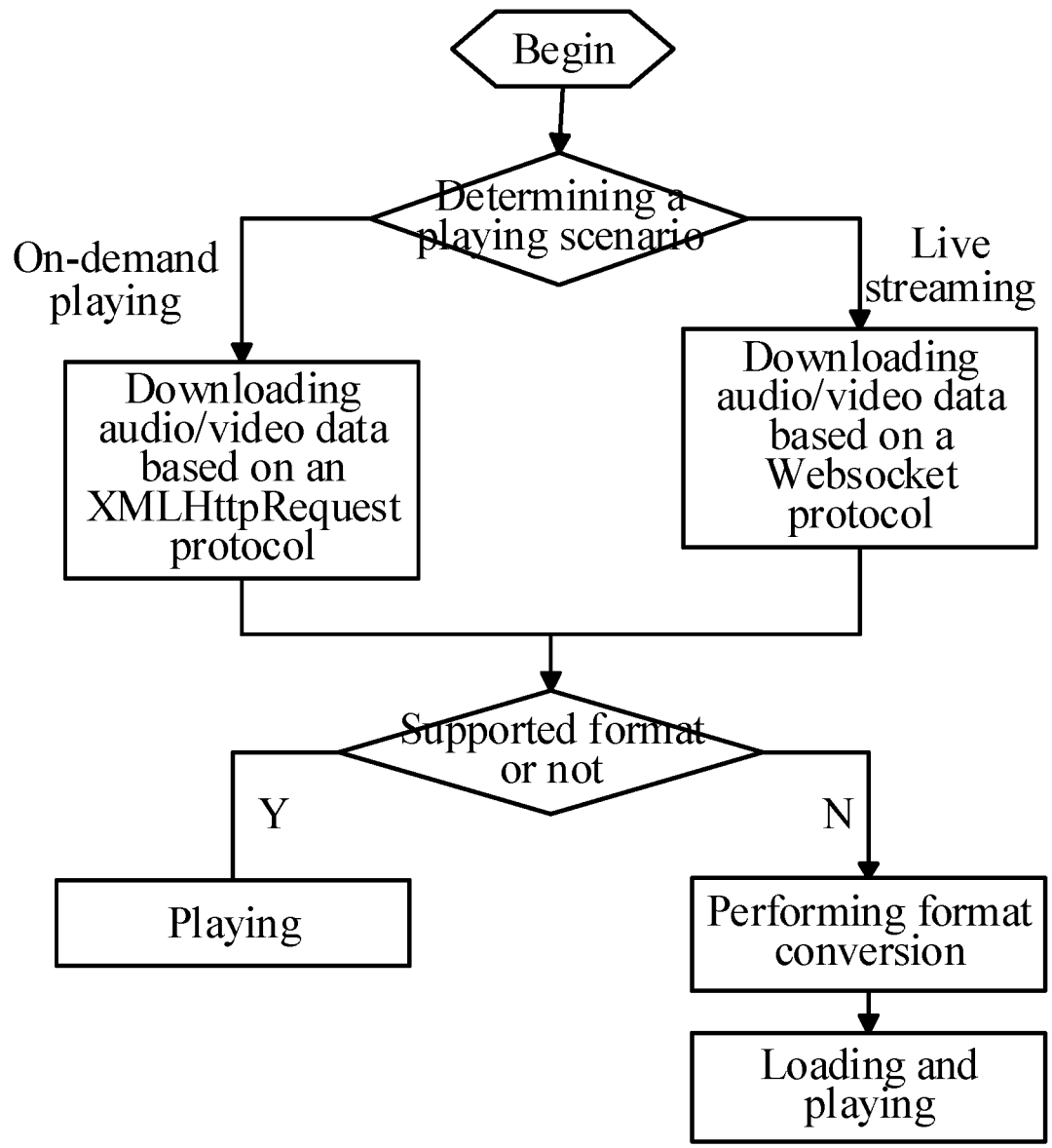
FIG. 3 illustrates a flow chart of another Html5-based audio/video playing method according to Embodiment 1 of the present disclosure.

Referring to FIG. 3, FIG. 3 illustrates a specific process in which an Html5 player applies a playing method according to the present disclosure.

First, based on a playing scenario, audio/video data is downloaded according to a corresponding protocol;

Further, whether a format of the downloaded audio/video data is a format supported by the Html5 player is determined. If the format of the downloaded audio/video data is a format supported by the Html5 player, the Html5 player plays the audio/video data directly; and if the format of the downloaded audio/video data is not a format supported by the Html5 player, format conversion is performed on the audio/video data to convert the format of the downloaded audio/video data into a format supported by the Html player.

Finally, the converted audio/video data is loaded into the Html5 player for playing.

By converting audio/video formats such as flv into a playing format supported by an Html5 player, the function of using the Html5 player to play an audio/video that has a format such as flv is realized, which enhances the compatibility of the Html5 player towards audio/video formats such as flv. Further, under the live streaming scenario, the Html5 player is utilized to replace the HLS protocol to directly play the audio/video data having an audio/video format like flv, such that the big issue of long-time delay brought about by the adoption of HLS protocol may be solved.

Embodiment 2

Figure 4:
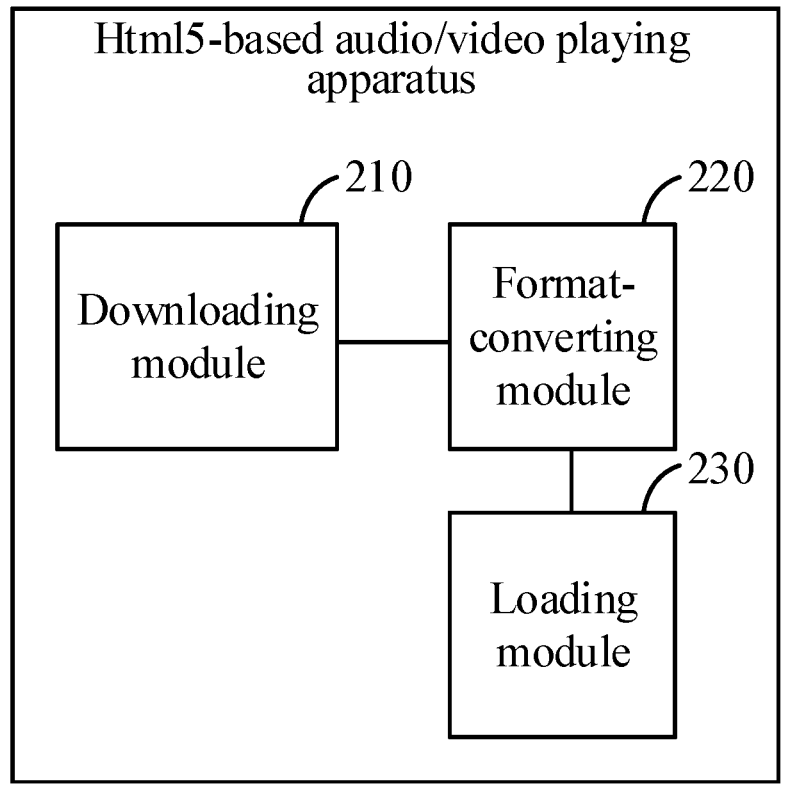
FIG. 4 illustrates a schematic view of an Html5-based audio/video playing apparatus according to Embodiment 2 of the present disclosure.

Referring to FIG. 4, embodiments of the present disclosure provide a schematic view of an Html5-based audio/video playing apparatus, including:

a downloading module 210, configured for, based on a playing scenario, downloading audio/video data under the playing scenario;

a format-converting module 220, configured for performing format conversion on the audio/video data;

a loading module 230, configured for loading the audio/video data after format conversion into an Html5 player.

In one embodiment, the Html5-based audio/video playing apparatus first converts the format of the audio/video data not supported by the Html5 player, e.g., flv, into a format supported by the Html5 player, and then loads the audio/video data after conversion into the Html5 player to complete the audio/video playing.

Figure 5:
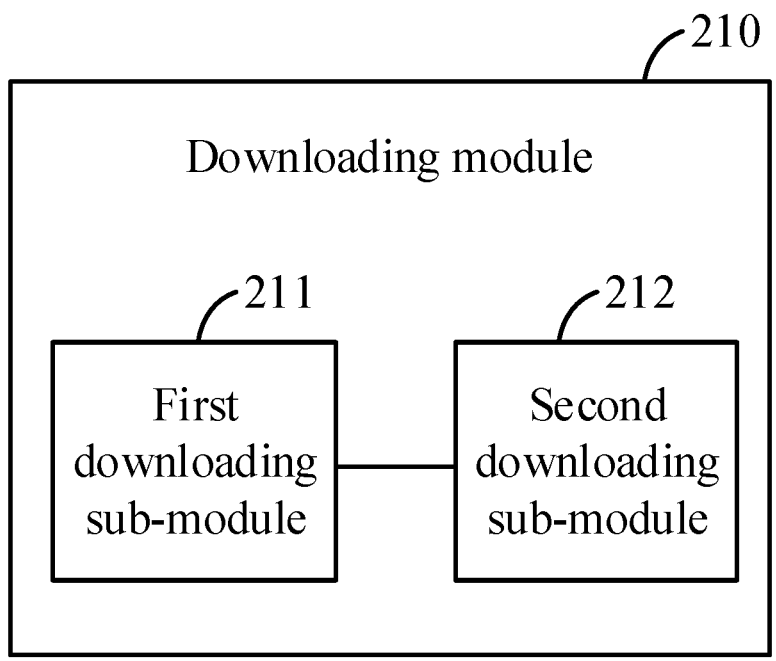
FIG. 5 illustrates a schematic view of a downloading module according to Embodiment 2 of the present disclosure.

Referring to FIG. 5, in one embodiment, the downloading module 210 includes a first downloading sub-module 211 and a second downloading sub-module 212.

The first downloading sub-module 211 is configured for, under an on-demand scenario, downloading the audio/video data. In one embodiment, the first downloading sub-module 211 may be an XHR downloader, and the audio/video data may be downloaded based on an XMLHttpRequest protocol.

The second downloading sub-module 212 is configured for, under a live streaming scenario, downloading the audio/video data. In one embodiment, the second downloading sub-module 212 may be a WS downloader, and the audio/video data may be downloaded based on a Websocket protocol.

It should be noted that, the downloading module 210 may include either the first downloading sub-module 211 or the second downloading sub-module 212. Under these situations, the Html5-based audio/video playing apparatus may realize the audio/video playing under the live streaming scenario or the audio/video playing under the on-demand scenario.

Figure 6:
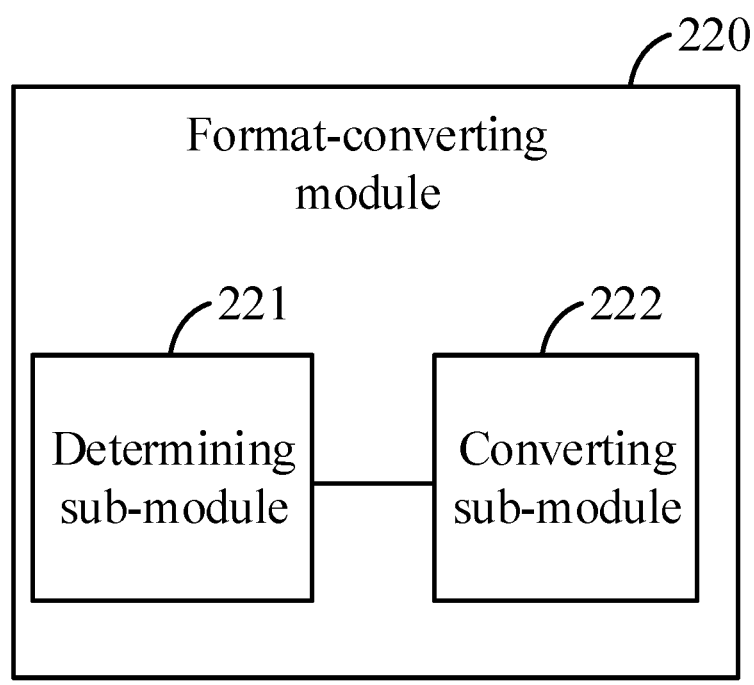
FIG. 6 illustrates a schematic view of a format-converting module according to Embodiment 2 of the present disclosure.

Referring to FIG. 6, in one embodiment, the format-converting module 220 includes a determining sub-module 221 and a converting sub-module 222.

The determining sub-module 221 is configured for recognizing a format of the audio/video data, and determining whether the format of the audio/video data is a format supported by the Html5 player. In one embodiment, if the format of the audio/video data is the mp4 format, the converting sub-module 222 does not need to be started to perform conversion, and the loading module 230 may directly load the audio/video data into the Html5 player for playing. If the format of the audio/video data is a flv format or other formats that need to be converted, the converting sub-module 222 may be started to perform format conversion.

The converting sub-module 222 is configured for, when the format of the audio/video data is not a format supported by the Html5 player, converting the format of the audio/video data into a format supported by the Html5 player.

In one embodiment, a process of loading, by the loading module 230, the audio/video data after format conversion into the Html5 player for playing specifically includes:

first, creating, by the loading module 230, mediaSource, and associating, by the loading module 230, the mediaSource with a video element;

further, creating, by the loading module 230, audioSourceBuffer and videoSourceBuffer for the mediaSource, for adding audio data and the video data, respectively;

finally, creating, by the loading module 230, audioSegments and videoSegments, to respectively store the audio data and video data in the audio/video data after format conversion, and adding, by the loading module 230, the audio data and video data to the audioSourceBuffer and videoSourceBuffer when appropriate, to complete the loading process.

In one embodiment, the format of the audio/video data at least includes a flv format.

Specifically, a process in which an Html5-based audio/video playing apparatus plays audio/video data in flv format may be as follows:

First, the downloading module 210, based on a playing scenario, calls the first downloading sub-module 211 or the second downloading sub-module 212. The first downloading sub-module 211 or the second downloading sub-module 212 may download audio/video data based on a corresponding protocol.

Further, the format-converting module 220 calls the determining sub-module 221, and the determining sub-module 221 determines whether a format of the audio/video data downloaded by the downloading module 210 is a format supported by an Html5 player.

If the format of the audio/video data downloaded by the downloading module 210 is a format supported by the Html5 player, the loading module 230 loads the audio/video data into the Html5 player directly for playing.

If the format of the audio/video data downloaded by the downloading module 210 is not a format supported by the Html5 player, the format-converting module 220 may call the converting sub-module 222. The converting sub-module 222 converts the format of the audio/video data into a format supported by the Html5 player, and loads the converted audio/video data into the Html5 player for playing.

By converting audio/video formats such as flv to a playing format supported by an Html5 player, embodiments of the present disclosure enable the Html5 player have a function to play an audio/video that has a format such as flv, which enhances the compatibility of the Html5 player towards audio/video formats such as flv. Further, under the live streaming scenario, the Html5 player is utilized to replace the HLS protocol to directly play the audio/video data having an audio/video format like flv, such that the big issue of long-time delay brought about by the adoption of HLS protocol may be solved.

Embodiment 3

In embodiments of the present disclosure, a live audio/video streaming method is provided, including the Html5-based audio/video playing method provided by Embodiment 1.

Embodiment 4

Embodiments of the present disclosure provides a live audio/video streaming system, including the Html5-based audio/video playing apparatus provided by Embodiment 2.

Sequence numbers of aforementioned embodiments of the present disclosure are merely for descriptive purposes, and do not represent any preference over the disclosed embodiments.

The apparatus embodiments described above are merely for illustrative purpose. The units described as separated parts may or may not be physically detached. The parts displayed as units may or may not be physical units, i.e., may be located at one place, or distributed at a plurality of network units. Based on the actual needs, a part or all of the modules may be selected to achieve the objective of the embodiments. Those ordinarily skilled in the art may understand and implement the disclosed embodiments without contributing creative labor.

Through the descriptions of various aforementioned embodiments, those skilled in the art may clearly understand that the embodiments may be implemented by means of software in conjunction with an essential common hardware platform, or may be simply implemented by hardware. Based on such understanding, the essential part of the aforementioned technical solutions or the part that contribute to the prior art may be embodied in the form of software products. The software products may be stored in computer readable storage media, such as ROM/RAM, magnetic disk, and optical disk, etc., and may include a plurality of instructions to enable a computer device (may be a personal computer, a server, or a network device) to execute the methods described in various embodiments or parts of the embodiments.

The foregoing are merely certain preferred embodiments of the present disclosure, and are not intended to limit the present disclosure. Without departing from the spirit and principles of the present disclosure, any modifications, equivalent substitutions, and improvements, etc. shall fall within the scope of the present disclosure.

What is claimed is:

1. An Html5-based audio/video playing method, comprising:

based on a playing scenario, downloading audio/video data under the playing scenario;

performing format conversion on the audio/video data;

loading the audio/video data after format conversion into an Html5 player;

wherein, the performing format conversion on the audio/video data includes:
  recognizing a format of the audio/video data, and determining whether the format of the audio/video data is a format supported by the Html5 player;
  when the format of the audio/video data is not a format supported by the Html5 player, converting the format of the audio/video data into a format supported by the Html5 player;
wherein, when the format of the audio/video data is not a format supported by the Html5 player, converting the format of the audio/video data into a format supported by the Html5 player includes:
  decoding the audio/video data that not supported by the Html5 player, and encoding the decoded audio/video data into a format supported by the Html5 player.

2. The method according to claim 1, wherein the based on a playing scenario, downloading audio/video data under the playing scenario includes:
  under the on-demand scenario, downloading the audio/video data based on an XMLHttpRequest protocol.

3. The method according to claim 1, wherein the based on a playing scenario, downloading audio/video data under the playing scenario includes:
  under the live streaming scenario, downloading the audio/video data based on a Web socket protocol.

4. The method according to claim 1, wherein:
  the format of the audio/video data at least includes a fly format.

5. A live audio/video streaming method according to claim 1, wherein:
  the live audio/video streaming method includes the Html5-based audio/video playing method.

6. An Html5-based audio/video playing apparatus, comprising a processor and a memory, when executing computer programs stored in the memory, the processor is configured for:
  based on a playing scenario, downloading audio/video data under the playing scenario;
  performing format conversion on the audio/video data; and
  loading the audio/video data after format conversion into an Html5 player;
  recognizing a format of the audio/video data, and determining whether the format of the audio/video data is a format supported by the Html5 player; and
  when the format of the audio/video data is not a format supported by the Html5 player, converting the format of the audio/video data into a format supported by the Html5 player;
    decoding the audio/video data that not supported by the Html5 player, and encoding the decoded audio/video data into a format supported by the Html5 player.

7. The apparatus according to claim 6, wherein:
  the processor is configured for, under an on-demand scenario, downloading the audio/video data based on a XMLHttpRequest protocol.

8. The apparatus according to claim 6, wherein:
  the processor is configured for, under a live streaming scenario, downloading the audio/video data based on a Websocket protocol.

9. The apparatus according to claim 6, wherein:
  the format of the audio/video data at least includes a fly format.

10. A live audio/video streaming system according to claim 6, wherein:
  the live audio/video streaming system includes an Html5-based audio/video playing apparatus.

11. The method according to claim 1, wherein the based on a playing scenario, downloading audio/video data under the playing scenario includes:
  selecting a data transmission protocol corresponding to the playing scenario;
  downloading the audio/video data under the playing scenario.

12. The method according to claim 1, further comprising:
  the format supported by the Html5 player is determined based on a type of a browser.

* * * * *